United States Patent
Mori

(10) Patent No.: US 9,855,836 B2
(45) Date of Patent: Jan. 2, 2018

(54) ELECTRIC VEHICLE

(71) Applicant: SUZUKI MOTOR CORPORATION, Hamamatsu-Shi, Shizuoka-Ken (JP)

(72) Inventor: Masaki Mori, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/335,686

(22) Filed: Oct. 27, 2016

(65) Prior Publication Data
US 2017/0113538 A1   Apr. 27, 2017

(30) Foreign Application Priority Data

Oct. 27, 2015  (JP) .................................. 2015-210390

(51) Int. Cl.
*B60K 11/08*   (2006.01)
*B60K 11/06*   (2006.01)

(52) U.S. Cl.
CPC .............. *B60K 11/08* (2013.01); *B60K 11/06* (2013.01)

(58) Field of Classification Search
CPC ......... B60K 11/00; B60K 11/06; B60K 11/08; B60K 11/085
See application file for complete search history.

(56) References Cited

U.S. PATENT DOCUMENTS

| | | | | |
|---|---|---|---|---|
| 4,685,530 A * | 8/1987 | Hara ....................... | B60K 11/08 | 123/41.27 |
| 4,744,432 A * | 5/1988 | Shibata .................... | B62K 5/01 | 123/41.65 |
| 4,793,293 A * | 12/1988 | Minami ................. | B60K 11/08 | 123/41.61 |
| 4,830,135 A * | 5/1989 | Yamashita ............. | B60K 11/08 | 123/41.7 |
| 4,982,973 A * | 1/1991 | Saito ....................... | B60K 11/08 | 180/229 |
| 5,577,747 A * | 11/1996 | Ogawa ..................... | B60K 1/04 | 180/220 |
| 5,715,904 A * | 2/1998 | Takahashi .............. | B60K 11/08 | 180/229 |
| 5,984,035 A * | 11/1999 | Katoh .................... | B62K 11/04 | 180/229 |
| 2011/0000727 A1* | 1/2011 | Froeschle .............. | B60J 1/2008 | 180/68.1 |
| 2011/0073288 A1* | 3/2011 | Hirukawa .............. | B60K 11/08 | 165/104.34 |
| 2012/0169143 A1* | 7/2012 | Nakagawa ........... | B60L 3/0046 | 307/328 |

(Continued)

FOREIGN PATENT DOCUMENTS

JP     2004352208 A     12/2004

*Primary Examiner* — Erez Gurari
(74) *Attorney, Agent, or Firm* — Barnes & Thornburg LLP

(57) ABSTRACT

An electric vehicle that is able to effectively cool the inverter while incorporating the inverter in the swing arm, and enhance the strength of the swing arm. The electric vehicle includes a driving wheel, a hollow swing arm main body for supporting the driving wheel, and an inverter accommodated in the swing arm main body. The swing arm main body includes a plurality of arc-shaped heat radiation fins provided in a wall surface facing a side face of the driving wheel, the heat radiation fins being concentric with the driving wheel. The inverter is in contact with the back face of the wall surface.

20 Claims, 10 Drawing Sheets

(56) References Cited

U.S. PATENT DOCUMENTS

| | | | |
|---|---|---|---|
| 2012/0199409 A1* | 8/2012 | Nakamura | B60K 1/04 180/220 |
| 2012/0234615 A1* | 9/2012 | Takamura | B60K 1/04 180/68.5 |
| 2014/0202782 A1* | 7/2014 | Tsukui | B60K 11/08 180/68.1 |
| 2014/0262584 A1* | 9/2014 | Lovold | B60K 5/12 180/246 |
| 2014/0291052 A1* | 10/2014 | Kaita | B60K 11/08 180/229 |
| 2016/0016623 A1* | 1/2016 | Ishii | B62J 17/00 180/229 |
| 2017/0113537 A1* | 4/2017 | Kawabata | B60K 11/08 |

* cited by examiner

ELECTRIC VEHICLE

CROSS-REFERENCE TO RELATED APPLICATIONS

This application claims the benefit of priority of Japanese Patent Application No. 2015-210390, filed on Oct. 27, 2015, the entire contents of which are incorporated herein by reference.

BACKGROUND OF THE INVENTION

Field of the Invention

The present invention relates to an electric vehicle.

Description of the Related Art

There is known an electric vehicle includes an electric motor for driving a rear wheel, a power control unit for controlling power to be supplied to the electric motor, and a unit case as a swing arm accommodating the electric motor and the power control unit (see, for example, Patent Literature 1 (Japanese Patent Laid-Open No. 2004-352208)).

SUMMARY OF THE INVENTION

The electric vehicle includes a cooling fin provided on the case of the power control unit. The cooling fin is exposed to the outside of the unit case through a window section provided in an inner wall of the unit case.

The cooling fin is curved in an arc shape from upward to rearward such that travelling wind and air flow caused by the rotation of the rear wheel can pass through. A plurality of the cooling fins is arranged in a line.

However, in a conventional electric vehicle, since cooling fins of the case of the power control unit are exposed to the outside through a window section of the unit case, the power control unit is covered with a two-fold case, that is, the unit case and the case of the power control unit which increase extra weight and cost.

Moreover, since providing a window section in the unit case which plays a role as a swing arm decreases the strength of the swing arm, it is difficult for a conventional electric vehicle to increase the opening area of the window section, and it is also difficult to ensure a sufficient area of the cooling fin.

To solve the problems described above, it is an object of the present invention to provide an electric vehicle that is able to effectively cool the inverter while incorporating the inverter in the swing arm, and enhance the strength of the swing arm.

To achieve the above object, an aspect of the present invention provides an electric vehicle including a hollow swing arm main body for supporting a driving wheel, and an inverter accommodated in the swing arm main body. The swing arm main body includes a plurality of arc-shaped heat radiation fins which are provided in a wall surface facing a side face of the driving wheel and are concentric with the driving wheel. The inverter is in contact with the back face of the wall surface.

In preferred embodiments of the above aspect, the following modes may be provided.

It may be desired that a greater portion of the inverter is superposed with the driving wheel when viewed from a rotational center axis direction of the driving wheel.

It may be desired that the heat radiation fin extends continuously with at least either of a top face or a bottom face of the swing arm main body.

It may be further desired that a wind guiding rib provided on at least either of the top face and the bottom face of the swing arm main body, the wind guiding rib extending along end parts of adjoining heat radiation fins.

It may be desired that the swing arm main body includes a reinforcing rib extending in the front-and-rear direction of the swing arm main body intersecting the heat radiation fins, or along end parts of the heat radiation fins.

It may be desired that the reinforcing rib extends along upper end parts of the heat radiation fins.

It may be desired that the reinforcing rib extends along lower end parts of the heat radiation fins.

It may be desired that the reinforcing rib includes a wind guiding port connecting to a space between the adjoining heat radiation fins.

It may be further desired that a boss superimposed on the heat radiation fin, and a fastener fastened to the boss, the fastener securing the inverter to the swing arm main body.

It may be desired that the plurality of heat radiation fins have heights varying conforming to the shape of the driving wheel.

This electric vehicle that is able to effectively cool the inverter while incorporating the inverter in the swing arm, and enhance the strength of the swing arm.

DETAILED DESCRIPTION OF THE PREFERRED EMBODIMENTS

Hereinafter, an embodiment of an electric vehicle according to the present invention will be described with reference to FIGS. 1 to 10.

Figure 1:
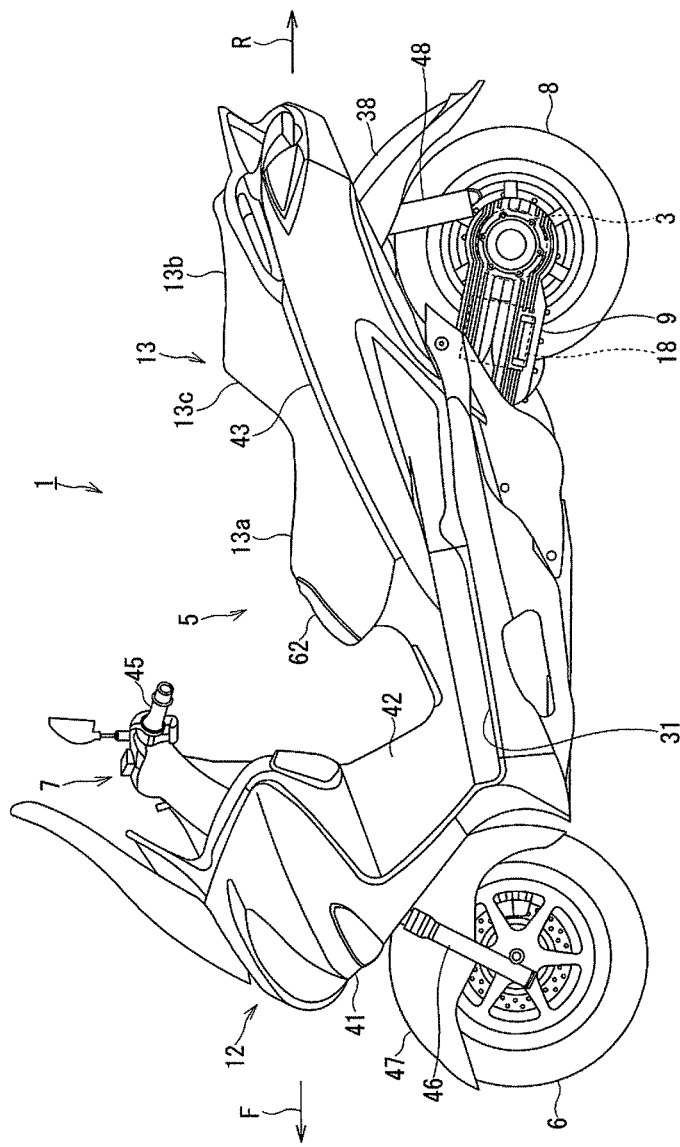
FIG. 1 is a left side view of an electric vehicle according to an embodiment of the present invention.

FIG. 1 is a left side view of the electric vehicle according to an embodiment of the present invention.

Figure 2:
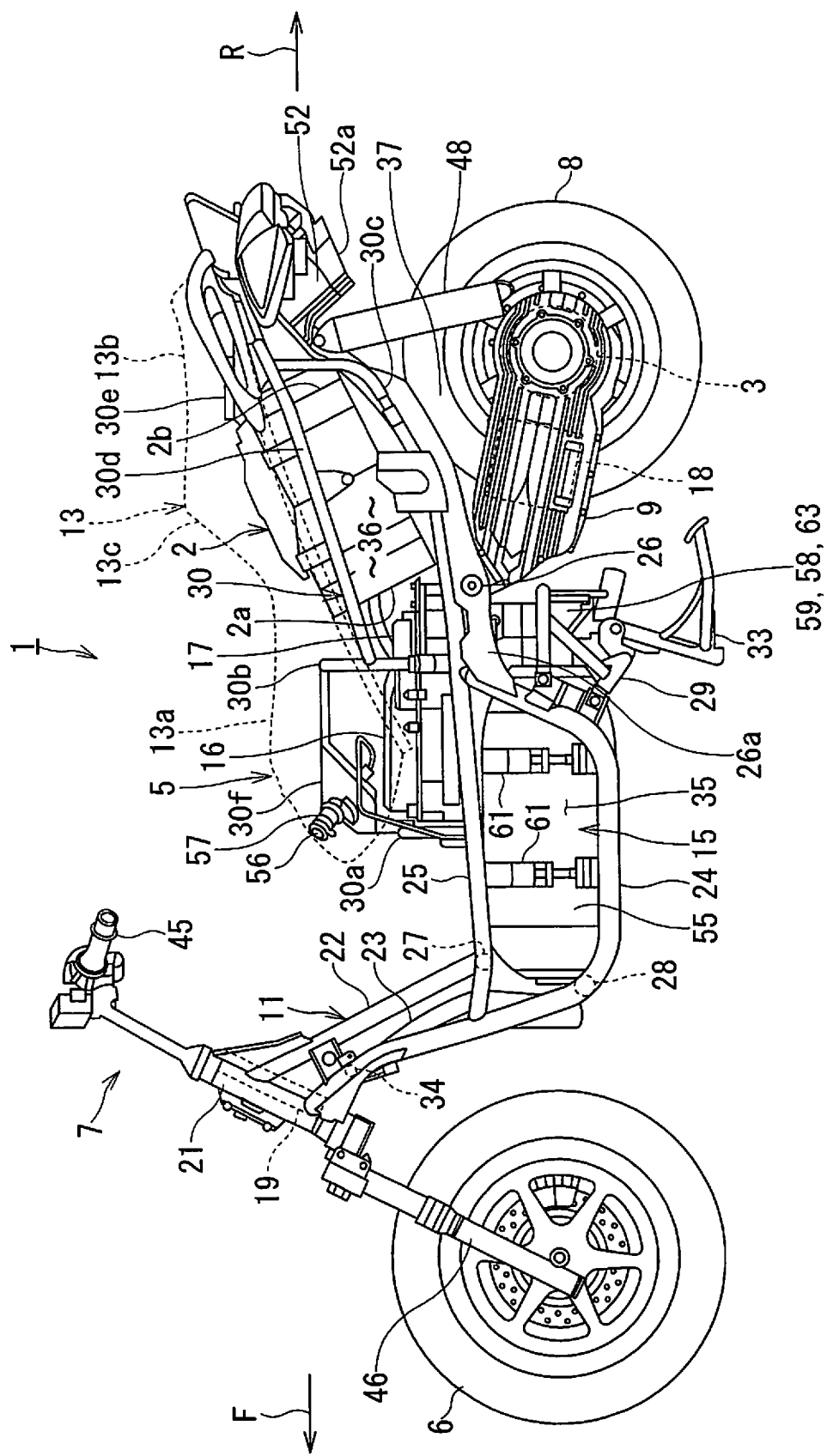
FIG. 2 is a left side view of the electric vehicle according to the embodiment of the present invention, with its exteriors detached.

FIG. 2 is a left side view of the electric vehicle according to an embodiment of the present invention, with its exteriors, for example, covers and a seat detached.

Figure 3:
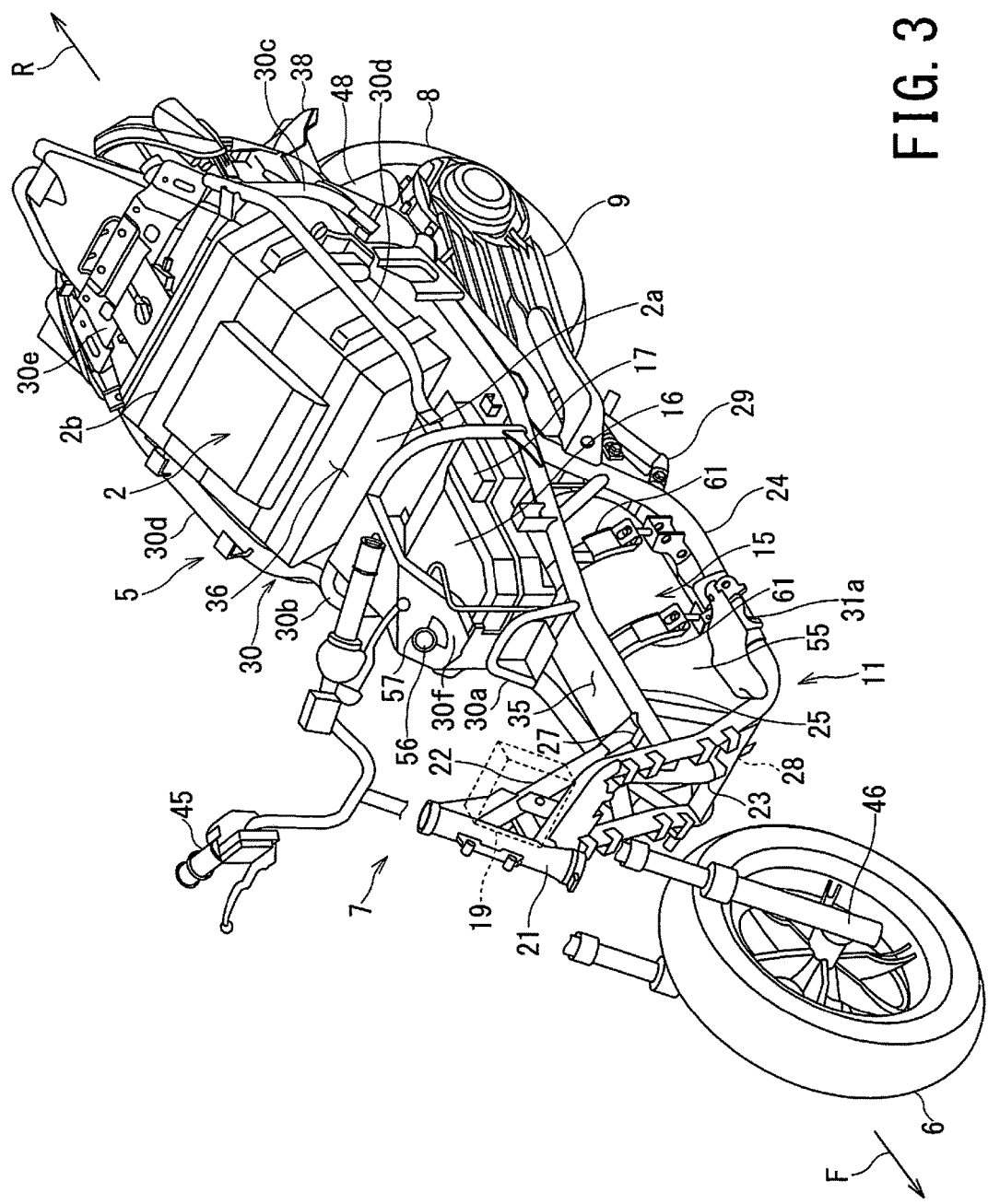
FIG. 3 is a perspective view of the electric vehicle according to the embodiment of the present invention, with its exteriors detached.

FIG. 3 is a perspective view of the electric vehicle according to an embodiment of the present invention, with its exteriors, for example, covers and a seat detached.

Note that expressions of front-and-rear, up-and-down, and left-and-right in the present embodiment are based on reference to a rider onboard an electric vehicle 1. In FIGS. 1 to 3, a solid line arrow F represents forward of the electric vehicle 1, and a solid line arrow R represents reward of the electric vehicle 1.

As shown in FIGS. 1 to 3, the electric vehicle 1 according to the present embodiment travels by being driven by an electric motor 3 powered by a fuel cell 2. The electric vehicle 1 is a motorcycle of motor-scooter type, and also a fuel cell powered bicycle traveling by the power of the fuel cell 2. The electric vehicle 1 may also be a tricycle. It may be a type of vehicle that travels by being driven by the electric motor 3 that is powered by a rechargeable battery (not shown) in place of the fuel cell 2.

The electric vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the electric vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The electric vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the electric vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the electric vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the electric vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the electric vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the electric vehicle 1 stand by itself in a leftwardly inclined manner. The side stand swings between an erected position for making the electric vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the electric vehicle 1 stand by itself in an upright state. The center stand 33 swings between an erected position for making the electric vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the electric vehicle 1 of a near-head-pipe bridge frame 34 constructed between the left and right lower frames 24, and a lower end part connected to a central part in the left and right direction of the electric vehicle 1 of the lower bridge frame 28.

The mounted-instrument protection frame 30 is provided above the rear half part of the upper frame 25. The mounted-instrument protection frame 30 supports and secures the fuel cell 2 to the electric vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the electric vehicle 1 of a motor-scooter type according to the present embodiment, the center tunnel region 35 is disposed along the front and rear direction of the electric vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the electric vehicle 1. The left and right upper frames 25 are bent at a spot where the lower ends of the center protection frame 30b are joined thereto, and extend to the rear of the electric vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the electric vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13*a* and rear half part 13*b* to the rear half part 13*b*. That is, in the side view of the vehicle, the fuel cell 2 is disposed between the rear half part 13*b* of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2*a* is disposed, faces forward and obliquely downward, and its back face, in which the exhaust port 2*b* is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2*a* of air, and configured to control the amount of air introduced to the fuel cell stack by opening/closing the intake port 2*a*. The intake shutter configured to constitute a circulation path for circulating air in the fuel cell 2 by closing the intake port 2*a*. The exhaust shutter includes an openable/closable exhaust port 2*b* of air and configured to constitute the circulation path for circulating air in the fuel cell 2 by closing the exhaust port 2*b*. In other words, the fuel cell 2 includes the openable/closable intake port 2*a* in the front face, and the openable/closable exhaust port 2*b* in the back face, and configured to cause air to be circulated in the fuel cell 2 by closing the intake port 2*a* and the exhaust port 2*b*.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52*a* opened toward rearwardly downward, and rearwardly upward at the rear end of the vehicle body 5. The exhaust duct 52 guides exhaust gas (excess gas) ejected from the fan of the fuel cell 2 to the exhaust port 52*a* and discharges it to the rear of the vehicle body 5.

The exhaust port 52*a* is disposed higher than the exhaust face (back face), and preferably at the upper end part of the rear section of the exhaust duct 52. In other words, the upper edge part of the exhaust port 52*a* is disposed at a position higher than the exhaust port of the fuel cell 2. As a result of having the exhaust port 52a disposed to be higher than the exhaust face (back face) of the fuel cell 2, the exhaust duct 52 guides a wet excess gas containing unreacted hydrogen gas to the exhaust port 52a and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the electric vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the electric vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the electric vehicle 1 includes, besides the rechargeable battery 16, a second rechargeable battery (not shown) supplying, for example, 12 V-based power as a power supply for meters (not shown) and lights (not shown). The second rechargeable battery is disposed around the head pipe 21, for example, beside the right side of the head pipe 21.

In the electric vehicle 1, even if hydrogen gas as fuel leaks from the fuel filling port 56, the hydrogen gas, which is lighter than air, moves up, thus diffusing to the outside of the electric vehicle 1 without residing within the electric vehicle 1. Even if hydrogen gas as fuel leaks from the fuel filling main valve 58 or the fuel supply main valve 59, the hydrogen gas moves toward the tire house region 37, thus diffusing to the outside of the electric vehicle 1 without residing within the electric vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the electric vehicle 1, for example, beside the left side of the head pipe 21 corresponding to the opposite side of the second rechargeable battery, which supplies 12 V-based power.

Next, the swing arm 9 of the electric vehicle 1 will be described in detail.

Figure 4:
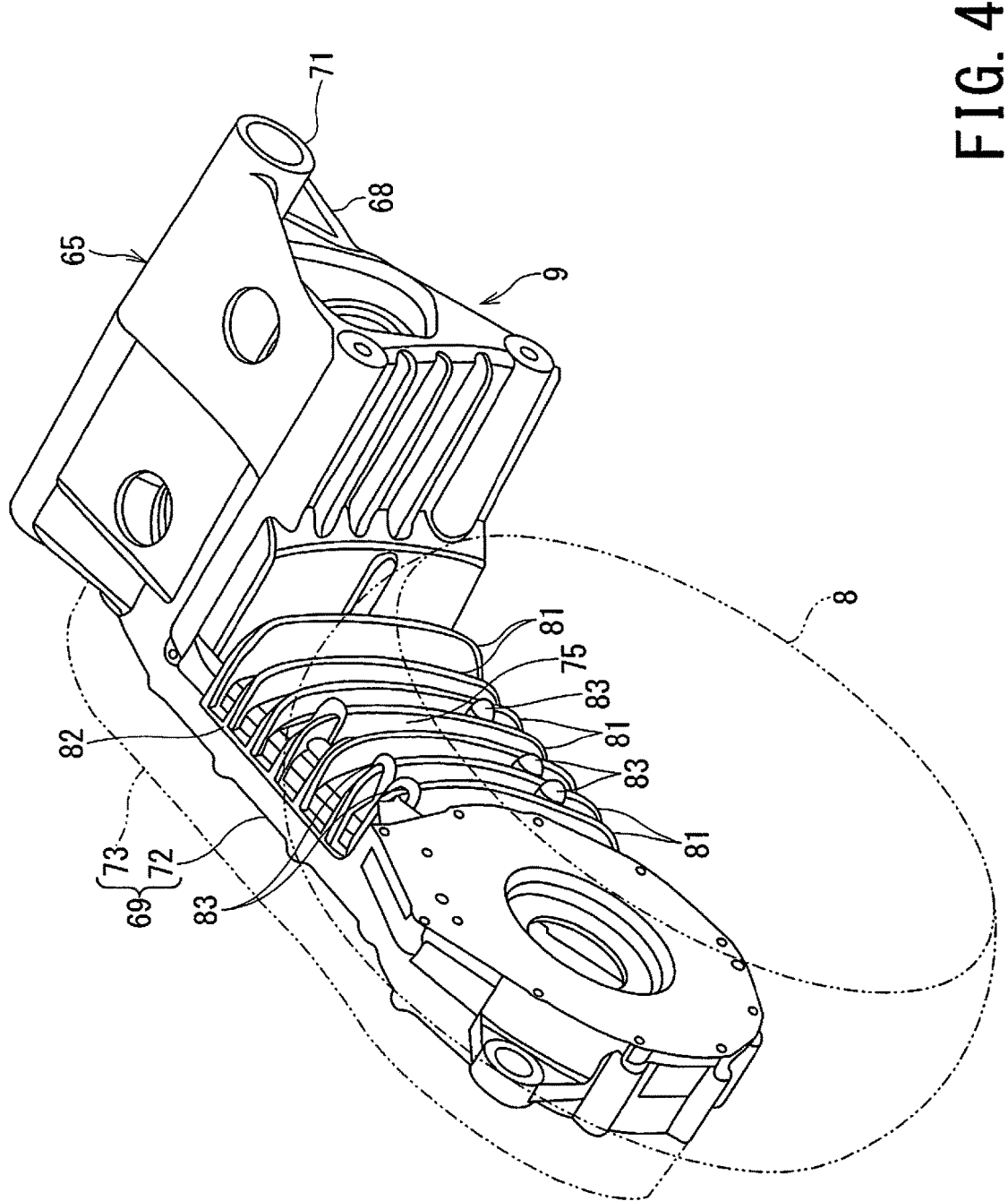
FIG. 4 is a perspective view of a swing arm of the electric vehicle according to the embodiment of the present invention.
Figure 5:
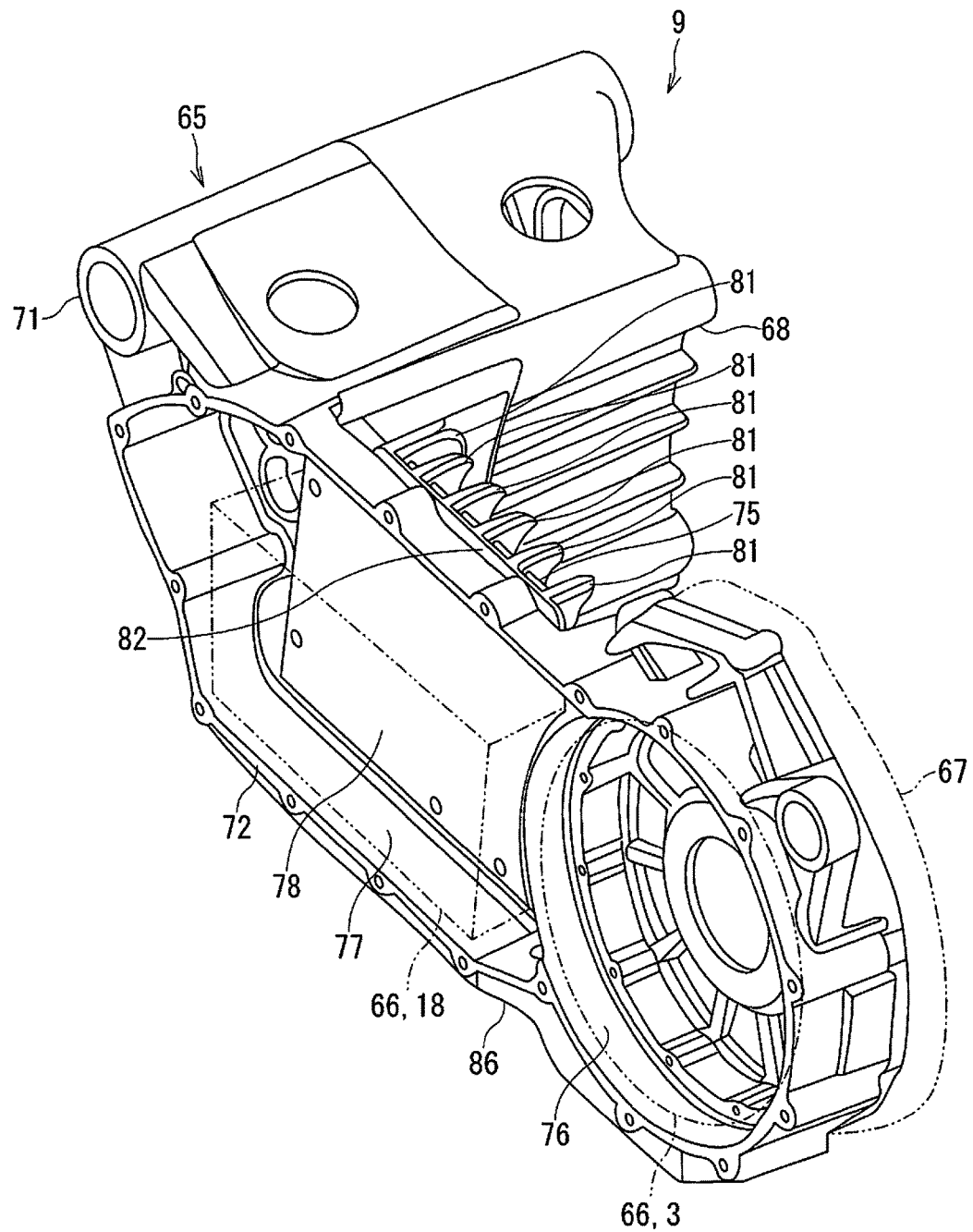
FIG. 5 is a perspective view of the swing arm of the electric vehicle according to the embodiment of the present invention.
Figure 6:
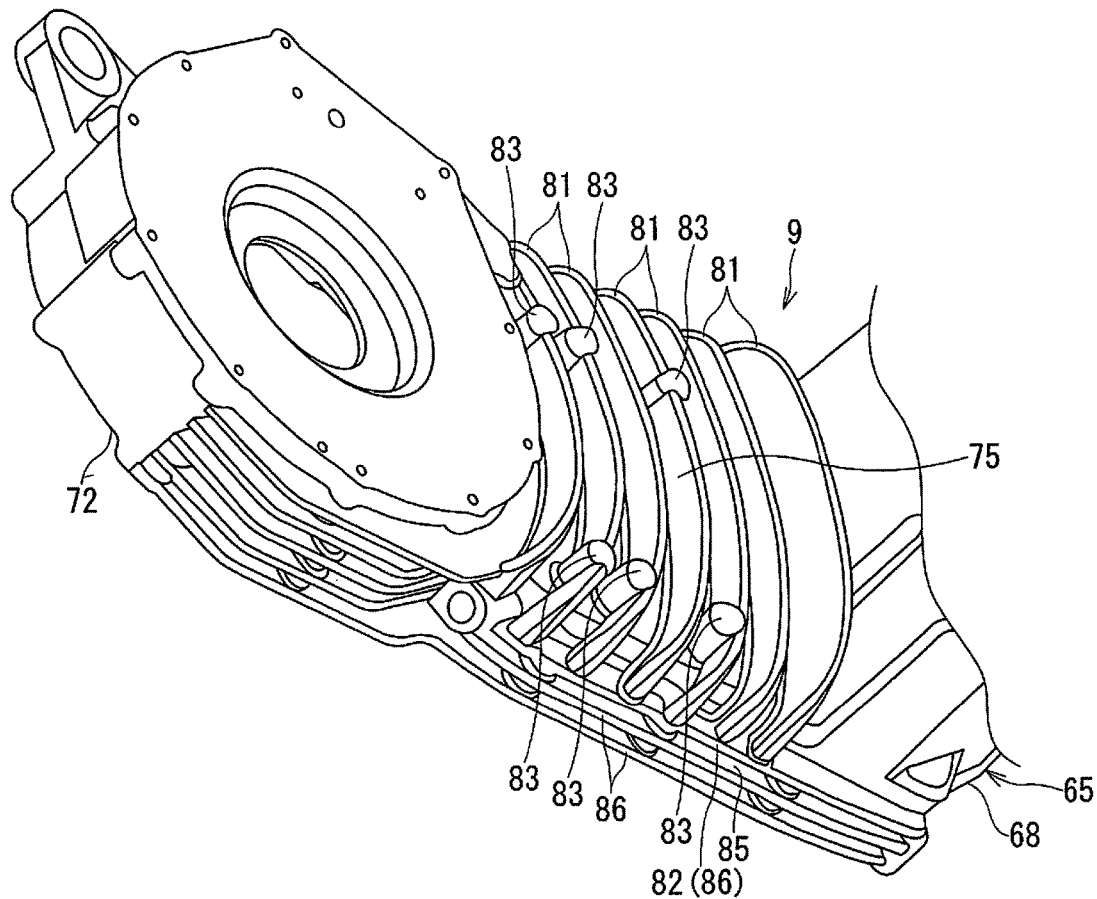
FIG. 6 is a perspective view of the swing arm of the electric vehicle according to the embodiment of the present invention.

FIGS. 4 to 6 are perspective views of the swing arm of the electric vehicle according to the embodiment of the present invention. They are perspective views of an inner case half body of a left-side swing arm.

Figure 7:
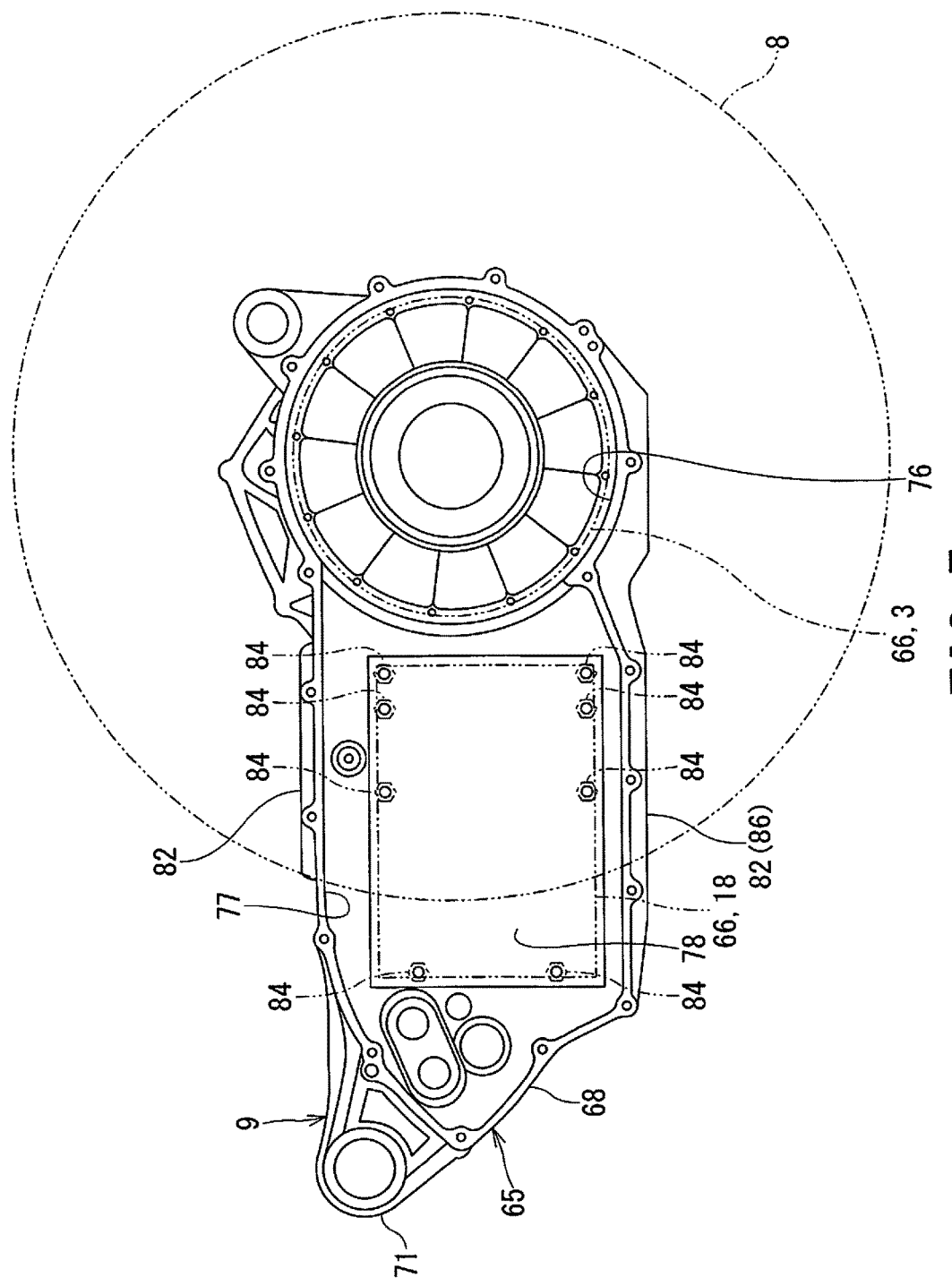
FIG. 7 is a left side view of the swing arm of the electric vehicle according to the embodiment of the present invention.

FIG. 7 is a left side view of the swing arm of the electric vehicle relating to the embodiment of the present invention. It is the left side view of the inner case half body of the left-side swing arm.

Figure 8:
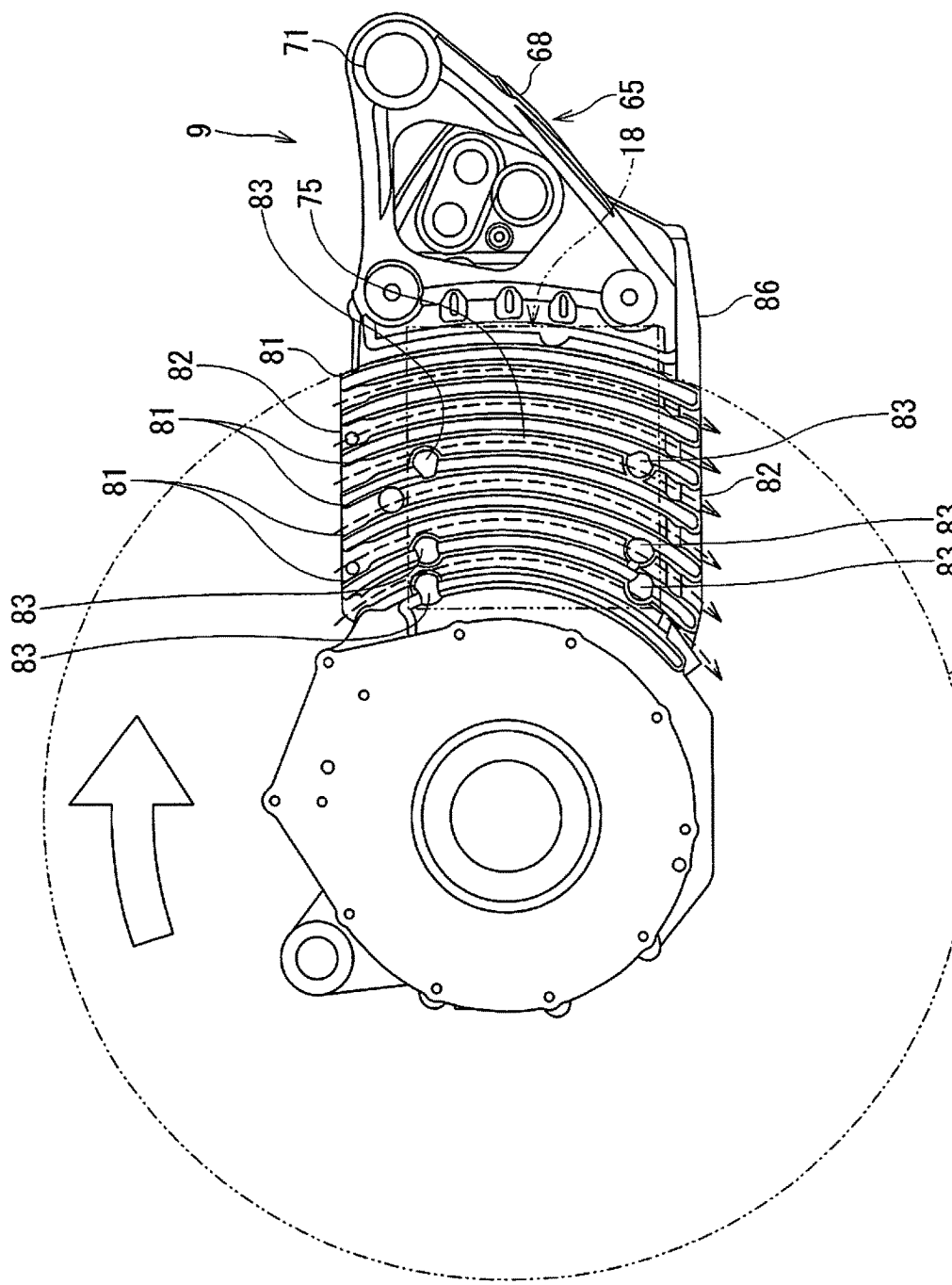
FIG. 8 is a right side view of the swing arm of the electric vehicle according to the embodiment of the present invention.

FIG. 8 is a right side view of the swing arm of the electric vehicle relating to the embodiment of the present invention. It is the right side view of the inner case half body of the left-side swing arm.

Figure 9:
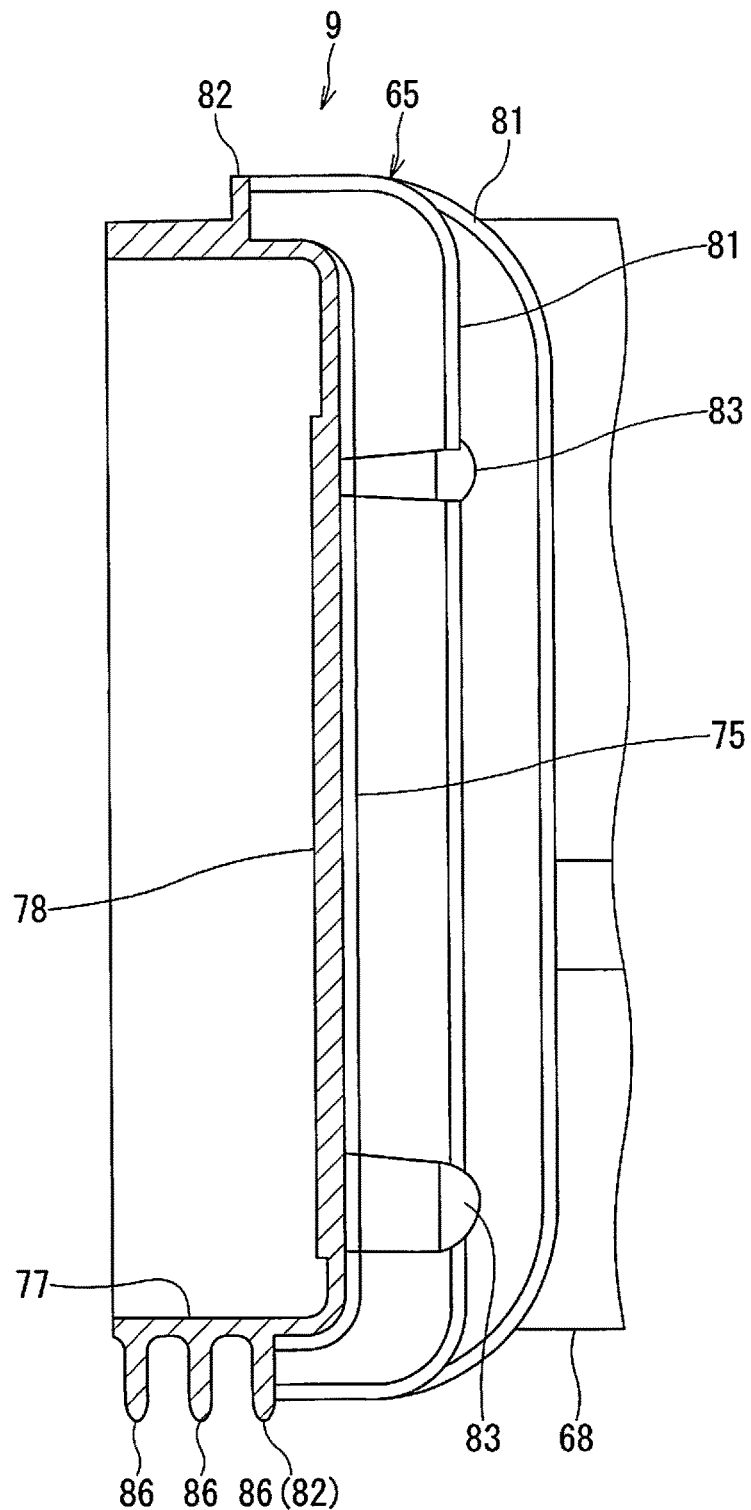
FIG. 9 is a cross sectional view of the swing arm of the electric vehicle according to the embodiment of the present invention.

FIG. 9 is a cross sectional view of the swing arm of the electric vehicle relating to the embodiment of the present invention. It is the cross sectional view of the inner case half body of the left-side swing arm.

As shown in FIGS. 4 to 9, the swing arm 9 of the electric vehicle 1 according to the present embodiment includes a hollow swing arm main body 65 supporting the rear wheel 8 from left side, a driving unit 66 accommodated in the swing arm main body 65, and a speed reducer 67 transmitting rotational driving force of the electric motor 3 to the rear wheel 8. The driving unit 66 includes an inverter 18 and the electric motor 3. The swing arm 9 includes an auxiliary arm (not shown), which is a right-side arm, attached to the right side of the swing arm main body 65. The auxiliary arm supports the rear wheel 8 from right side.

The swing arm main body 65 includes a pivot section 68 supported by a pivot shaft 26 of the vehicle body 5, a driving unit housing 69 extending rearward from either side, from left side in this case, of the pivot section 68, reaching the left side of the rear wheel 8.

The pivot section 68 extends in a width direction of the frame 11, spreading to the whole width of the inside of the frame 11. In the side view, the pivot section 68 is a box body of a triangular shape spreading downward with a hollow pipe part 71 as the vertex, the hollow pipe part 71 penetrating the swing arm main body 65 in the left and right direction. The pivot shaft 26 is disposed in the pipe part 71.

The pivot section 68 has a weight reduction hole in each of upper, lower, left and right walls. The weight reduction holes are utilized for the wiring of power lines and signal lines to the driving unit 66, and also utilized as a working hole for wiring. The right wall of the pivot section 68 serves as an attaching face of the auxiliary arm. In a rear corner part of the right wall of the pivot section 68, there is formed threaded holes for fastening and securing the auxiliary arm. The left wall of the pivot section 68 is a part of the inner side face 75, which is a wall surface, defining a driving unit housing 69. The left wall of the pivot section 68 has holes. Power lines and signal lines to the driving unit 66 are passed through the holes.

The driving unit housing 69 includes an inner case half body 72 being integral with the pivot section 68; and an outer case half body 73 closing the inner case half body 72. The inner case half body 72 and the outer case half body 73 are combined in such a way to be separable in the left and right direction of the electric vehicle 1 with a dividing face, which is perpendicular to the vehicle body 5 and extends in the front and rear direction of the vehicle body 5, as a boundary.

The inner case half body 72 has an inner side face 75, which is the wall surface, facing the side face of the rear wheel 8, and defines a space opened to the left side of the electric vehicle 1.

The outer case half body 73 plays a role of a lid closing the inner case half body 72 from the left side of the electric vehicle 1.

Note that the driving unit housing 69 may be disposed on the right side of the electric vehicle 1. In this case, the disposition of the inner case half body 72 and the outer case half body 73 is reversed in the left and right direction, and the relationship with the rear wheel 8 is also reversed in the left and right direction.

A motor chamber 76 for accommodating the electric motor 3 is defined in a rear end part of the driving unit housing 69. An inverter chamber 77 is defined in a space located in front of the motor chamber 76, that is, a space closer to the pivot section 68 than to the motor chamber 76. That is, the inverter chamber 77 is disposed between the motor chamber 76 and the pivot section 68. The motor chamber 76 and the inverter chamber 77 are closed by the inner case half body 72 and the outer case half body 73 so that inflow of outside air is restricted. Of the inner surfaces of the inverter chamber 77, a back face 78, which is an inner surface of the inner side face 75 of the inner case half body 72, is flat and serves as an installation face (attaching face) of the inverter 18. The space between the flat back face 78 and the inverter 18 is filled with heat radiation grease (not shown) to facilitate the thermal connection between the inverter 18 and the swing arm main body 65.

The swing arm main body 65 includes a plurality of arc-shaped heat radiation fins 81 provided in the inner side face 75, which is the wall surface, facing the side face of the rear wheel 8. The heat radiation fins 81 are concentric with the rotational axis of the rear wheel 8.

Each heat radiation fin 81 is an arch-shaped fin whose radius substantially corresponds to its distance from the rotational center line, that is, the axle center of the rear wheel 8. The heat radiation fins 81 are arranged substantially at an equal interval. The heat radiation fins 81 protrude from the inner side face 75 toward the side face of the rear wheel 8 being disposed on the right side in the width direction of the electric vehicle 1.

The plurality of heat radiation fins 81 each extends continuously with at least either of the top face and the bottom face of the swing arm main body 65. That is, the plurality of heat radiation fins 81 each extend from a right outer surface of the inner side face 75 in such a way to go around continuously with either of the upper side of the top face of the swing arm main body 65 defining the inverter chamber 77 and the lower side of the bottom face of the swing arm main body 65.

The plurality of heat radiation fins 81 have heights varying conforming to the shape of the rear wheel 8. The heat radiation fins 81 protrude conforming to the shape of the rear wheel 8 so as to leave a gap to an extent not to interfere with the rear wheel 8, and keep the gap to be substantially constant. The tip end of a heat radiation fin 81, which is located on a front side of the vehicle, that is, an outer diameter side of the rear wheel 8, protrudes further toward the center line in the left and right direction of the electric vehicle 1 than that of a heat radiation fin 81 located on a rear side of the electric vehicle 1.

Further, the swing arm 9 includes a wind guiding rib 82 provided on at least either of the top face and the bottom face of the swing arm main body 65. The wind guiding rib 82 connects and extends along end parts of adjoining heat radiation fins 81. The wind guiding rib 82 protrudes in the up and down direction, and restricts air flow generated by the rotation of the rear wheel 8 from escaping in the direction apart from the rear wheel 8, which is opposite side, as left side of the electric vehicle 1, and guides it to the heat radiation fins 81 disposed on the side of the rear wheel 8. Note that FIG. 9 shows the embodiment in which the heat radiation fins 81 are extended on both of the top face and the bottom face, and also the wind guiding rib 82 is provided on both the top face and the bottom face.

The wind guiding rib 82 protrudes in the up and down direction at about same level of height as the heat radiation fin 81, and extends along the front and rear direction of the electric vehicle 1 to be connected to ends of spaces between the heat radiation fins 81.

The swing arm 9 includes a plurality of the bosses 83 positioned so as to be superposed on a heat radiation fin 81 of the inner side face 75, and a plurality of fasteners 84 fastened to the bosses 83. The boss 83 has a threaded hole opening only to an internal space of the inverter chamber 77, and whose axis corresponds to the left and right direction of the electric vehicle 1. That is, the boss 83 ensures a volume of the threaded hole by increasing the thickness of a part of the heat radiation fin 81. The boss 83 is disposed so as not to interconnect adjoining heat radiation fins 81, and therefore is disposed not to block the passage of air flow between the heat radiation fins 81. The fastener 84, for example, a bolt is screwed in the threaded hole, and secures the inverter 18 to the swing arm main body 65.

The inverter 18 is thermally connected to the back face 78 of the inner side face 75 of the inner case half body 72, which is an inner surface of the inverter chamber 77. A greater portion of the inverter 18 is superposed with the rear wheel 8 when viewed from a rotational axis direction of the rear wheel 8. In other words, in a side view of the electric vehicle 1, a greater portion of the inverter 18 is superposed in a sidewardly projected region of the rear wheel 8.

A speed reducer 67 is attached to an inner side face, that is, a face on the side of the rear wheel 8, of the motor chamber 76. The speed reducer 67 includes a rear wheel axle (not shown) as an output shaft. The rear wheel 8 is secured to the rear wheel axle.

The rear wheel 8 is disposed on the center axis of the electric vehicle 1, in the rear of the pivot section 68 of the swing arm main body 65, and on the right side of the driving unit housing 69. In a side view of the electric vehicle 1, a part of the left side face of the rear wheel 8 is superposed with the driving unit housing 69 of the swing arm main body 65, and in this superposed portion, the entire electric motor 3 and a major portion of the inverter 18 are disposed.

The swing arm 9 includes, besides the heat radiation fin 81 of the inner side face 75 of the inner case half body 72, a plurality of heat radiation fins 86 in the lower surface of the bottom face 85 of the inner case half body 72.

The plurality of heat radiation fins 86 are provided over the entire area of the bottom face 85 of the inner case half body 72, that is, over the entire area of the base face from the inverter chamber 77 to the motor chamber 76. The plurality of heat radiation fins 86 extend in the front and rear direction of the electric vehicle 1, that is, in the longitudinal direction of the driving unit housing 69, and are arranged in a width direction of the driving unit housing 69. The plurality of heat radiation fins 86 protrude toward downward.

The heat radiation fins 86 are integrally provided in the swing arm main body 65, specifically in the inner case half body 72. The heat radiation fins 86 are integrated with the wind guiding rib 82 on the bottom face side.

The electric vehicle 1 according to the present embodiment causes the air flow (shown by a broken line in FIG. 8) which is involved in the rotation of the rear wheel 8 (shown by a white arrow in FIG. 8) to flow along the heat radiation fins 81. The air flow flowing along the heat radiation fins 81 cools the swing arm main body 65, particularly the inner side face 75, which has the heat radiation fins 81, of the inner case half body 72, thereby depriving heat from the inverter 18 which is in contact with the back face 78 of the inner side face 75 of the inner case half body 72. The air flow, which has deprived heat of the inverter 18 via the heat radiation fins 81, flows out to the bottom face side of the swing arm 9 along the heat radiation fins 81, eventually being discharged to the rear of the vehicle due to travel wind and air flow passing through the heat radiation fins 86.

Since the heights of the heat radiation fins 81 vary following the shape of the rear wheel 8, thus keeping a gap between the fins and the rear wheel 8 to be substantially constant, it is possible to cause the air flow caused by rotation of the rear wheel 8 to come into contact with the heat radiation fins 81, thus effectively cooling the inverter 18 by the air flow passing through between the heat radiation fins 81.

Since the air flow generated through rotation of the rear wheel 8 is straightened by the wind guiding ribs 82, air smoothly flows into a space between the heat radiation fins 81, and is also smoothly discharged.

Since the boss 83 is superposed on the heat radiation fin 81, the air flow passing through between the heat radiation fins 81 will not be obstructed by the boss 83.

Next, other examples of the swing arm 9 of the electric vehicle 1 according to the present embodiment will be described. Note that in a swing arm 9A to be described in another example, the same configurations as those of the swing arm 9 are given the same reference symbols, thereby omitting overlapping description.

Figure 10:
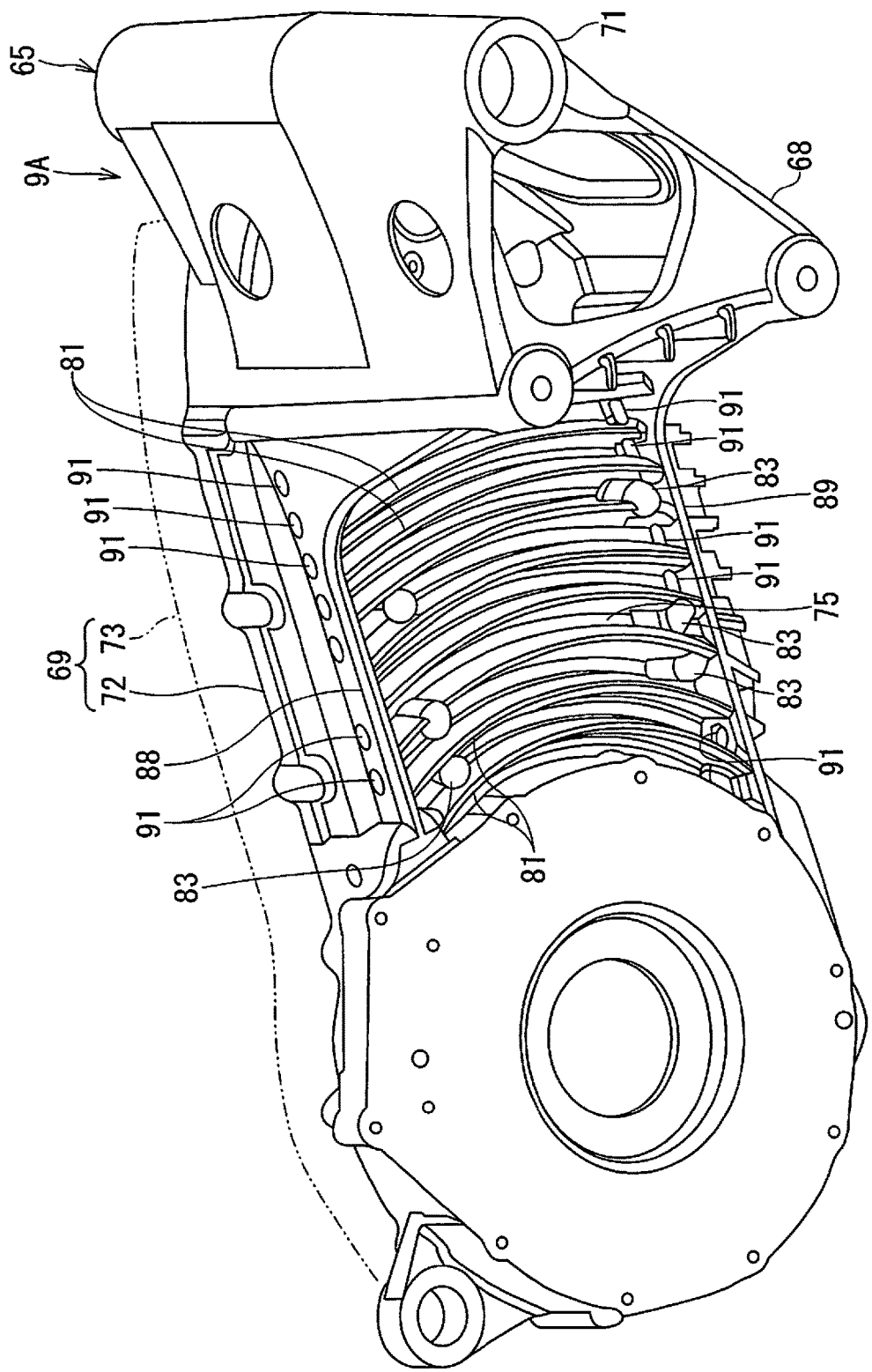
FIG. 10 is a perspective view of another example of the swing arm of the electric vehicle according to the embodiment of the present invention.

FIG. 10 is a perspective view of another example of the swing arm of the electric vehicle according to the embodiment of the present invention. It is a perspective view of the inner case half body of the left-side swing arm viewed from upward on the tire side (right side).

As shown in FIG. 10, the swing arm 9A according to the present embodiment includes reinforcing ribs 88, 89 extending in the front and rear direction of the swing arm main body 65 intersecting with the heat radiation fins 81, or along end parts of the heat radiation fins 81, in upper and lower edge parts of the inner side face 75 of the swing arm 9A.

The reinforcing ribs 88, 89 are provided in the inner side face 75, which is the wall surface, facing the side face of the rear wheel 8, and protrude in a direction approaching the rear wheel 8. That is, the reinforcing ribs 88, 89 protrude toward the rear wheel 8 in the left and right direction of the electric vehicle 1. The heights of the reinforcing ribs 88, 89 are larger than those of the heat radiation fins 81 within a range not to interfere with the rear wheel 8. The reinforcing rib 88 is provided at the upper edge part of the inner side face 75, and interconnects upper end parts of the heat radiation fins 81 along the upper end parts of the heat radiation fins 81. The reinforcing rib 89 is provided at the lower edge part of the inner side face 75, and interconnects lower end parts of the heat radiation fins 81 along the lower end parts of the heat radiation fins 81. The reinforcing rib 88 is provided at the upper edge part of the inner side face 75, disposed in parallel with the top face and at a position lower than the top face, and integrally formed with the swing arm main body 65. The reinforcing rib 89 is provided at the lower edge part of the inner side face 75, disposed in parallel with the bottom face and at a position higher than the bottom face, and integrally formed with the swing arm main body 65.

The reinforcing ribs 88, 89, as well as the heat radiation fins 81, have heights varying conforming to the shape of the rear wheel 8. The reinforcing ribs 88, 89 protrude conforming to the shape of the rear wheel 8 so as to leave a gap to an extent not to interfere with the rear wheel 8, and keep the gap to be substantially constant. The reinforcing rib 88 extends over a range from the inner side face 75 of the driving unit housing 69 to the back face, which is the face on the rear wheel 8 side, of the pivot section 68 so as to cross the front face of the rear wheel 8, and reinforces discontinuous portions of the shape of the swing arm main body 65. That is, the reinforcing ribs 88, 89 interconnects the inner side face 75 with a central part in the left and right direction of the back face of the pivot section 68 to reinforce corner parts being coupled into an L-shape in a planar view, between the inner side face 75 of the inner case half body 72 and the pivot section 68.

The reinforcing ribs 88, 89 need not to abut against the upper end parts or lower end parts of the heat radiation fins 81, and may be positioned closer to the center of the inner side face 75. The reinforcing ribs 88, 89 may be provided at only one of the upper end parts and the lower end parts of the heat radiation fins 81, and beside those, may be those that extend in the front and rear direction at around middle of the heat radiation fins 81, that is, at a central part in the up and down direction of the inner side face 75.

The reinforcing ribs 88, 89 include a wind guiding port 91 connecting to a space between the adjoining heat radiation fins 81. The wind guiding port 91 is a hole through which air flow generated through rotation of the rear wheel 8 passes, and as well as the wind guiding rib 82 of the swing arm 9, straightens the air flow generated through rotation of the rear wheel 8, thereby smoothly guiding it to a space between the heat radiation fins 81 and also smoothly discharging it.

Although the swing arm 9A according to the present embodiment includes the reinforcing ribs 88, 89 and thereby reinforces corner parts of the inner case half body 72, it causes the air flow generated through rotation of the rear wheel 8 to flow along the heat radiation fins 81 by the wind guiding ports 91 formed in the reinforcing ribs 88, 89. The air flow that flows along the heat radiation fins 81 cools the swing arm main body 65, particularly the inner side face 75 of the inner case half body 72, thereby depriving heat from the inverter 18 which is in contact with the back face 78 of the inner side face 75 of the inner case half body 72. The air flow, which has deprived heat of the inverter 18 via the heat radiation fins 81, flows out to the bottom face side of the swing arm 9A along the heat radiation fins 81, eventually being discharged to the rear of the vehicle by travel wind and air flow passing through the heat radiation fins 86.

Since the heights of the heat radiation fins 81 vary following the shape of the rear wheel 8, thus keeping a gap between the fins and the rear wheel 8 to be substantially constant, it is possible to reliably cause the air flow caused by rotation of the rear wheel 8 to come into contact with the heat radiation fins 81, thus effectively cooling the inverter 18 by the air flow passing through between the heat radiation fins 81.

Since the air flow generated through rotation of the rear wheel 8 is straightened by the wind guiding ports 91 of the reinforcing rib 88, air smoothly flows into a space between the heat radiation fins 81, and is also smoothly discharged.

Since the boss 83 is superposed on the heat radiation fin 81, the air flow passing through between the heat radiation fins 81 will not be obstructed by the boss 83.

The electric vehicle 1 according to the present embodiment includes a plurality of arc-shaped heat radiation fins 81 being provided in the inner side face 75 facing the side face of the rear wheel 8, and the heat radiation fins 81 being concentric with the rear wheel 8, so that the air flow caused by rotation of the rear wheel 8 smoothly passes through a space between the heat radiation fins 81 without significantly changing its moving direction, thus making it possible to effectively deprive heat of the inverter 18.

Further, the electric vehicle 1 according to the present embodiment can be, in contrast to a conventional electric vehicle, provided with heat radiation fins 81 over substantially entire area of the inner side face 75 of the swing arm main body 65, and thereby exhibits high cooling performance.

Further, the electric vehicle 1 according to the present embodiment does not need an opening, for example, a window section in a conventional electric vehicle, in the swing arm main body 65, and thus will not cause decrease in the strength of the swing arm main body 65.

Further, the electric vehicle 1 according to the present embodiment does not need an opening, for example, a window section in a conventional electric vehicle, in the swing arm main body 65, so that water and dust will not enter through the opening, and thus excellent water proof and dust proof is achieved.

Further, the electric vehicle 1 according to the present embodiment disposes the inverter 18 such that a greater portion thereof is superposed with the rear wheel 8 when viewed from a rotational axis direction of the rear wheel 8, and thereby can deprive heat of the inverter 18 more effectively.

Further, the electric vehicle 1 according to the present embodiment includes a heat radiation fin 81 extending continuously with at least either of the top face or the bottom face of the swing arm main body 65, and thereby makes it possible to enhance the strength of the swing arm main body 65, and improve rigidity against deformation particularly of a mode in which a dividing face of the inner case half body 72 opens up. That is, the swing arm 9 of the electric vehicle 1 according to the present embodiment includes a heat radiation fin 81 extending continuously with at least either of the top face or the bottom face of the swing arm main body 65, and thereby makes it possible to improve rigidity against deformation that end edges on the dividing face side between the top face and the bottom face separated from each other.

Further, the electric vehicle 1 according to the present embodiment includes the wind guiding rib 82 extending along end parts of adjoining heat radiation fins 81 and thereby makes it possible to smoothly lead the air caught up in the rear wheel 8 to the heat radiation fins 81 and restrict air from flowing in opposite direction, which is the left side of the electric vehicle 1.

Further, the electric vehicle 1 according to the present embodiment includes reinforcing ribs 88, 89 extending in the front and rear direction of the swing arm main body 65 intersecting with the heat radiation fins 81, or along end parts of the heat radiation fins 81, and thereby makes it possible to improve the torsional rigidity and bending rigidity of the swing arm main body 65 extending in a cantilever manner.

Further, the electric vehicle 1 according to the present embodiment includes a wind guiding port 91 connecting to a space between the adjoining heat radiation fins 81, and thereby makes it possible to combine improvements of the reinforcement of the swing arm main body 65 and the cooling performance of the inverter 18. The wind guiding ports 91 of the reinforcing rib 89 being disposed at lower end parts of the heat radiation fins 81 prevent foreign matters, such as sand and mud swirled up by the rear wheel 8, from clogging between the heat radiation fins 81.

Further, the electric vehicle 1 according to the present embodiment includes the boss 83 being superposed on a heat radiation fin 81 of the inner side face 75, and to which a fastener (not shown) for securing the inverter 18 to the swing arm main body 65 is fastened, and thereby makes it easy to secure the inverter 18 to the back face 78 of the inner side face 75 of the driving unit housing 69, without causing the cooling performance of the heat radiation fin 81 to deteriorate.

Further, the electric vehicle 1 according to the present embodiment includes heat radiation fins 81 whose heights varying conforming to the shape of the rear wheel 8, and thereby makes it possible to more effectively guide the air, which gets caught in the rear wheel 8, to the heat radiation fins 81.

Therefore, the electric vehicle 1 according to the present invention, it is possible to effectively cool the inverter 18 while incorporating the inverter 18 in the swing arm main body 65, and enhance the strength of the swing arm main body 65.

What is claimed is:

1. An electric vehicle, comprising:
    a driving wheel;
    a hollow swing arm main body for supporting the driving wheel; and
    an inverter accommodated in the swing arm main body, wherein
    the swing arm main body includes a plurality of arc-shaped heat radiation fins provided in a wall surface facing a side face of the driving wheel, the heat radiation fins being concentric with the driving wheel, and
    the inverter is in contact with the back face of the wall surface.

2. The electric vehicle according to claim 1, wherein
    a greater portion of the inverter is superposed with the driving wheel when viewed from a rotational center axis direction of the driving wheel.

3. The electric vehicle according to claim 1, wherein
    the heat radiation fin extends continuously with at least either of a top face or a bottom face of the swing arm main body.

4. The electric vehicle according to claim 2, wherein
    the heat radiation fin extends continuously with at least either of a top face or a bottom face of the swing arm main body.

5. The electric vehicle according to claim 3, further comprising
    a wind guiding rib provided on at least either of the top face and the bottom face of the swing arm main body, the wind guiding rib extending along end parts of adjoining heat radiation fins.

6. The electric vehicle according to claim 4, further comprising
    a wind guiding rib provided on at least either of the top face and the bottom face of the swing arm main body, the wind guiding rib extending along end parts of adjoining heat radiation fins.

7. The electric vehicle according to claim 1, wherein
    the swing arm main body includes a reinforcing rib extending in a front-and-rear direction of the swing arm main body intersecting the heat radiation fins, or along end parts of the heat radiation fins.

8. The electric vehicle according to claim 7, wherein
    the reinforcing rib extends along upper end parts of the heat radiation fins.

9. The electric vehicle according to claim 7, wherein
    the reinforcing rib extends along lower end parts of the heat radiation fins.

10. The electric vehicle according to claim 7, wherein
    the reinforcing rib includes a wind guiding port connecting to a space between the adjoining heat radiation fins.

11. The electric vehicle according to claim 8, wherein
    the reinforcing rib includes a wind guiding port connecting to a space between the adjoining heat radiation fins.

12. The electric vehicle according to claim 9, wherein
    the reinforcing rib includes a wind guiding port connecting to a space between the adjoining heat radiation fins.

13. The electric vehicle according to claim 1, further comprising
    a boss superimposed on the heat radiation fin; and
    a fastener fastened to the boss, the fastener securing the inverter to the swing arm main body.

14. The electric vehicle according to claim 2, further comprising
    a boss superimposed on the heat radiation fin; and
    a fastener fastened to the boss, the fastener securing the inverter to the swing arm main body.

15. The electric vehicle according to claim 3, further comprising
    a boss superimposed on the heat radiation fin; and
    a fastener fastened to the boss, the fastener securing the inverter to the swing arm main body.

16. The electric vehicle according to claim 7, further comprising
    a boss superimposed on the heat radiation fin; and
    a fastener fastened to the boss, the fastener securing the inverter to the swing arm main body.

17. The electric vehicle according to claim 1, wherein
    the plurality of heat radiation fins have heights varying conforming to a shape of the driving wheel.

18. The electric vehicle according to claim 2, wherein
    the plurality of heat radiation fins have heights varying conforming to a shape of the driving wheel.

19. The electric vehicle according to claim 3, wherein
    the plurality of heat radiation fins have heights varying conforming to a shape of the driving wheel.

20. The electric vehicle according to claim 7, wherein
    the plurality of heat radiation fins have heights varying conforming to a shape of the driving wheel.

* * * * *